(12) United States Patent
Brandl et al.

(10) Patent No.: US 11,274,170 B2
(45) Date of Patent: Mar. 15, 2022

(54) POLYMERIZATION PROCESS

(71) Applicant: ExxonMobil Chemical Patents Inc., Baytown, TX (US)

(72) Inventors: Corrine L. Brandl, Houston, TX (US); Fred D. Ehrman, Houston, TX (US); James R. Lattner, La Porte, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 252 days.

(21) Appl. No.: 16/336,987

(22) PCT Filed: Sep. 7, 2017

(86) PCT No.: PCT/US2017/050421
§ 371 (c)(1),
(2) Date: Mar. 27, 2019

(87) PCT Pub. No.: WO2018/063764
PCT Pub. Date: Apr. 5, 2018

(65) Prior Publication Data
US 2019/0218318 A1 Jul. 18, 2019

Related U.S. Application Data

(60) Provisional application No. 62/400,258, filed on Sep. 27, 2016.

(30) Foreign Application Priority Data

Nov. 10, 2016 (EP) ..................................... 16198129

(51) Int. Cl.
*C08F 210/16* (2006.01)
*C08F 2/34* (2006.01)
(Continued)

(52) U.S. Cl.
CPC .............. *C08F 210/16* (2013.01); *C08F 2/00* (2013.01); *C08F 2/34* (2013.01); *C08F 210/02* (2013.01);
(Continued)

(58) Field of Classification Search
CPC ...... C08F 210/16; C08F 2/34; C08F 2500/12; C08K 5/01
See application file for complete search history.

(56) References Cited

U.S. PATENT DOCUMENTS 5,352,749 A 10/1994 DeChellis et al.
5,453,471 A 9/1995 Bernier et al.
(Continued)

FOREIGN PATENT DOCUMENTS

WO 94/28032 A 12/1994
WO 01/49750 A 7/2001
(Continued)

OTHER PUBLICATIONS

U.S. Appl. No. 62/400,250, filed Sep. 27, 2016.

*Primary Examiner* — Catherine S Branch
(74) *Attorney, Agent, or Firm* — ExxonMobil Chemical Patents Inc.—Law Department

(57) ABSTRACT

A process including contacting one or more monomers, at least one catalyst system, and at least two condensing agents under polymerizable conditions to produce a polyolefin polymer is provided where the vapor pressure of the condensing agents is ±4 bara of the optimum vapor pressure given by the formula: optimum vapor pressure=614−716*D+2.338*P+3.603*ln(MI), where the optimum vapor pressure has units (bara), D is the polyolefin polymer density with units (g/cc), P is the polymerization condition pressure with units (barg), and MI is the polyolefin polymer melt
(Continued)

index with units (g/10 min). The invention also relates to a process where at least three condensing agents are used.

20 Claims, 1 Drawing Sheet

(51) Int. Cl.
    *C08K 5/01*     (2006.01)
    *C08F 210/02*     (2006.01)
    *C08F 2/00*     (2006.01)
    *C08F 4/14*     (2006.01)
    *C08F 4/24*     (2006.01)
    *C08F 4/80*     (2006.01)

(52) U.S. Cl.
    CPC ................ *C08K 5/01* (2013.01); *C08F 4/14* (2013.01); *C08F 4/24* (2013.01); *C08F 4/80* (2013.01); *C08F 2500/08* (2013.01); *C08F 2500/12* (2013.01)

(56) References Cited

U.S. PATENT DOCUMENTS

| | | |
|---|---|---|
| 6,063,877 A | 5/2000 | Kocian et al. |
| 6,262,192 B1 | 7/2001 | Wu |
| 6,391,985 B1 | 5/2002 | Goode et al. |
| 6,759,489 B1 | 7/2004 | Turkistani |
| 7,531,606 B2 | 5/2009 | Hendrickson |
| 7,683,140 B2 | 3/2010 | Pannell et al. |
| 7,696,289 B2 | 4/2010 | Fischbuch et al. |
| 7,774,178 B2 | 8/2010 | Pannell et al. |
| 7,858,719 B2 | 12/2010 | Hagerty et al. |
| 2005/0137364 A1 | 6/2005 | Cai et al. |
| 2005/0182207 A1 | 8/2005 | Singh et al. |
| 2005/0267268 A1 | 12/2005 | Hendrickson |
| 2005/0267269 A1 | 12/2005 | Hagerty et al. |
| 2007/0265400 A1 | 11/2007 | Fischbuch et al. |
| 2012/0041164 A1 | 2/2012 | Kolb et al. |
| 2016/0031244 A1 | 2/2016 | Miller |

FOREIGN PATENT DOCUMENTS

| | | |
|---|---|---|
| WO | 2011/147539 A | 12/2011 |
| WO | 2016/086006 A | 6/2016 |
| WO | 2016/182920 A | 11/2016 |

POLYMERIZATION PROCESS

PRIORITY CLAIM

This application is a National Phase Application claiming priority to PCT Application Ser. No. PCT/US2017/050421 filed Sep. 7, 2017, which claims priority to and benefit of U.S. Provisional Ser. No. 62/400,258 filed Sep. 27, 2016, and EP 16198129.5, filed Nov. 10, 2016, which are incorporated by reference in their entirety.

CROSS-REFERENCE TO RELATED APPLICATIONS

The present application is related to U.S. Provisional Application No. 62/400,261, filed Sep. 27, 2016, entitled "Polymerization Process", and U.S. Provisional Application No. 62/400,250, filed Sep. 27, 2016, entitled "Polymerization Process" both of which are incorporated by reference.

FIELD OF THE INVENTION

The disclosure relates to polymerization processes for the production of polyolefin polymers. In particular, the disclosure relates to gas phase polymerization processes that employ certain condensing agents.

BACKGROUND OF THE INVENTION

The condensing mode of operation in gas phase polymerization reactors significantly increases the production rate by providing extra heat-removal capacity through the evaporation of condensates in the cycle gas. Additional condensation is often promoted to extend the utility of condensed mode operation by adding an inert condensing agent ("ICA") into the reactor. The most commonly used ICA's in commercial practice are n-pentane, isopentane, n-butane, isohexane, and isobutane. The amount of ICA that can be introduced into the reactor, however, must be kept below the "stickiness limit" beyond which the bed material becomes too sticky to discharge or to maintain a normal fluidization status. Running in excess of this limit will result in different types of fouling or sheeting in various locations in the reactor system. The primary limitation on increasing the reaction rate in a fluidized bed reactor is the rate at which heat can be removed from the polymerization zone. For example, in the commercial application of one of the most commons ICA's, isopentane, concentrations are pushed to the maximum allowable levels but no higher so as to avoid expanded dome section sheeting or agglomeration of polymer particles in a gas phase reactor.

An additional limitation arises around grade flexibility in commercial applications where the maximum production rate for lower density polymers is sufficiently different from the production rate for higher density polymers such that downstream extruder turndown limitations require costly or impractical workarounds, e.g., building multiple smaller extruders (less efficient) instead of one large extruder or operating an extruder intermittently.

Past endeavors have attempted to improve on this technology by providing higher production rates for longer continuous run times and to bring the production rates for lower density polymers closer to the rates for higher density polymers.

U.S. Pat. No. 5,352,749, is directed to a process for polymerizing alpha-olefin(s) in a gas phase reactor having a fluidized bed and a fluidizing medium wherein the fluidizing medium serves to control the cooling capacity of said reactor. A description of condensable fluids is provided in Col. 6, lines 31-47.

U.S. Pat. No. 6,063,877 is directed to a process for controlling a continuous gas phase exothermic process in a reactor to maintain a constant temperature differential (ΔT) between the temperature of reactor inlet and reactor bed or outlet by using a heat exchanger and flow of a condensable fluid to the reactor. Examples of condensable fluids are listed in Col. 2, lines 24-34.

U.S. Pat. No. 7,696,289 is directed to a gas phase polymerization process utilizing a low molecular weight dew point increasing component and a high molecular weight dew point increasing component. ICA's are described, for example, at Col. 15, lines 34-45, and Claim 5.

U.S. Pat. No. 7,858,719 is directed to a gas phase process for polymerizing one or more hydrocarbon monomer(s) in a reactor in the presence of a catalyst system and a fluorinated hydrocarbon. A number of fluorinated hydrocarbons under the section header, "Condensable Fluids," may be found in Col. 19 to Col. 21.

U.S. Patent Application Publication No. 2005/0182207 is directed to a continuous gas fluidized bed polymerization process for the production of a polymer from a monomer using at least two inert condensing agents selected from the group consisting of alkanes, cycloalkanes, and mixtures thereof, each of the inert condensing agents having a normal boiling point less than 40° C. Table 1 provides a listing of ICA's.

PCT Application Number PCT/US2016/031244 is directed to gas phase polymerization processes that employ certain condensing agents, including 2,2-dimethylpropane.

Other background references include WO 94/28021; WO 94/28032; WO 2011/147539; and U.S. Pat. Nos. 5,453,471; 6,262,192; 7,683,140; and 7,531,606.

Despite these past endeavors, there is a need and desire to increase production rates while maintaining the continuity of the reactor system in a continuous process. Additionally, there is also a desire for greater grade flexibility. That is, there is need for broadening the polymer grade operating windows to produce polymers with different properties at higher production rates, for example, decreasing the density or raising the melt index of the polymer, which was not previously possible with current commercial practices due to the limitations of process conditions and readily available ICA's. Further, there is a need to identify optimal concentrations when at least two or at least three condensing agents are used.

SUMMARY OF THE INVENTION

A formula has been discovered that provides the optimum vapor pressure for two or more condensing agents for increased production rate and increased grade flexibility. Accordingly, the invention relates to a polymerization process, the process comprising contacting one or more monomers, at least one catalyst system, and at least two condensing agents under polymerization conditions to produce a polyolefin polymer; wherein the vapor pressure of the condensing agents is ±4 bara of the optimum vapor pressure given by the formula: optimum vapor pressure=614−716*D+2.338*P+3.603*ln(MI), where the optimum vapor pressure has units (bara), D is the polyolefin polymer density (ASTM D1505) with units (g/cc), P is the polymerization condition pressure with units (barg), and MI is the polyolefin polymer melt index ($I_{2.16}$) (ASTM D1238) with units (g/10 min). The invention also relates to the above process where at least three condensing agents are used.

The invention also relates to a process for determining the concentration of two or more condensing agents for polyolefin polymerization, the process comprising i) providing one or more monomers, at least one catalyst system, and at least two condensing agents, ii) selecting a polyolefin density and melt index as well as a polymerization condition pressure, and iii) adjusting the condensing agent composition so the vapor pressure of the condensing agents is within ±4 bara of the optimum vapor pressure given by the formula: optimum vapor pressure=614−716*D+2.338*P+3.603*ln (MI), where the optimum vapor pressure has units (bara), D is the polyolefin polymer density (ASTM D1505) with units (g/cc), P is the polymerization condition pressure with units (barg), and MI is the polyolefin polymer melt index ($I_{2.16}$) (ASTM D1238) with units (g/10 min). The invention also relates to the above process where at least three condensing agents are used.

In some aspects of the invention, the condensing agents can comprise >20 mol % isobutane based on amount of condensing agents. The invention also relates to the condensing agents comprise isobutane and 2,2-dimethylpropane. In other aspects of the invention, the condensing agents comprise isobutane and isopentane.

As mentioned, the invention also relates to increased production rate. When expressed on a per unit of reactor volume basis, the production rate is called the "space time yield". In some embodiments, the polyolefin density (ASTM D1505) is ≤0.912 g/cm³ and the space time yield is >200 kg/m³/hr. In some embodiments, the space time yield is >250 kg/m³/hr. Other embodiments of the invention will be apparent as from the description and claims in the following disclosure.

DETAILED DESCRIPTION

Figure 1:
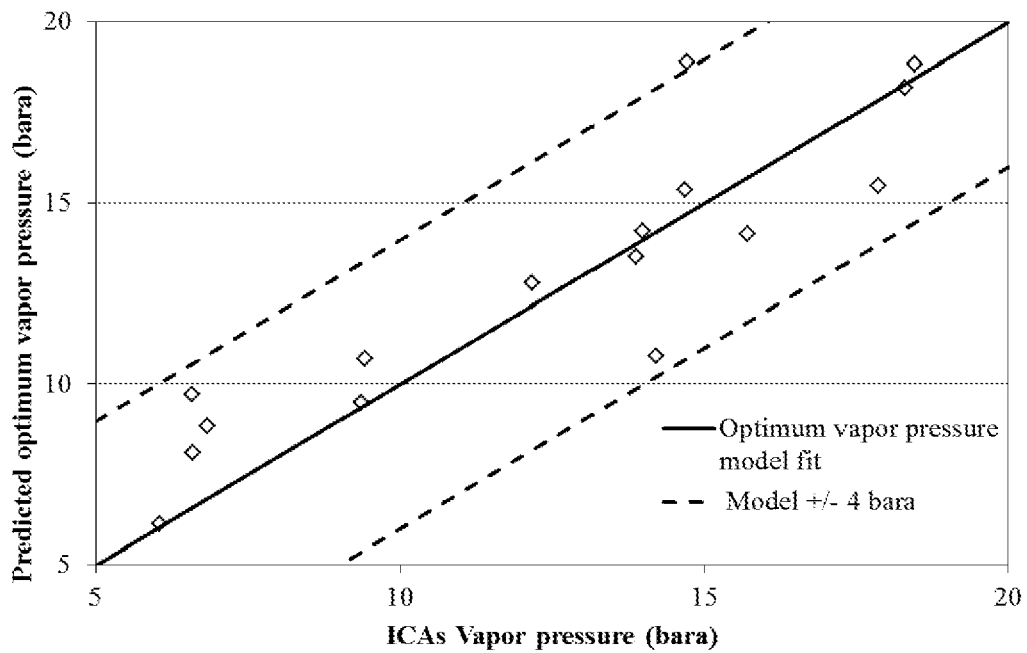
FIG. 1 contrasts the inventive optimum ICA vapor pressure calculation results for each ICA blend for examples 9-24 with the ICA vapor pressure.

Before the present compounds, components, compositions, and/or methods are disclosed and described, it is to be understood that unless otherwise indicated, this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a", "an" and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

The invention is generally directed toward polymerization processes, particularly, gas phase processes, for polymerizing one or more monomer(s) in the presence of at least one catalyst system. The invention also relates in several classes of embodiments to polymerization processes having increased production rates and/or product capabilities.

The polymerization processes described herein may be a continuous process. As used herein, "a continuous process" is process that operates (or is intended to operate) without interruption or cessation but of course may be interrupted for customary maintenance or for the occasional disrupting event. For example, a continuous process to produce a polymer would be one in which the reactants are continuously introduced into one or more reactors and polymer product is continually or semi-continually withdrawn.

In many classes of embodiments of the invention, the invention provides for a gas phase process for polymerizing one or more monomer(s) in the presence of at least one catalyst system and at least two condensing agents wherein the process is operated in a condensed mode. In some embodiments three or more condensing agents are used.

Condensing agents or fluids generally include hydrocarbons having little to no solvent power regarding the polymer product(s). Suitable condensing agents include $C_3$-$C_8$ hydrocarbons and mixtures thereof, preferably $C_3$-$C_6$ hydrocarbons and mixtures thereof, including linear, branched, cyclic, substituted hydrocarbons, as well as their respective isomers. In particular, the condensing agent may comprise a mixture of two or more $C_3$-$C_8$ hydrocarbons, e.g., propane, n-butane, isobutane, n-pentane, isopentane, 2,2-dimethylpropane, n-hexane, isohexane, n-heptane, n-octane.

In some embodiments of the invention, the condensing agents comprise >20 mol % isobutane, e.g., >30, >40, >50, >60 mol % isobutane, based on the amount of condensing agents. In some embodiments, the condensing agents comprise >20 mol %, e.g., >30, >40, >50, >60 mol % isobutane and the polyolefin polymer density (ASTM D1505) is <0.920, e.g., <0.918, <0.912, <0.910 g/cc. As used herein, polyolefin or polymer density is measured by ASTM D1505.

In other embodiments, the condensing agents comprise a majority of isobutane when used in combination with at least one other condensing agent. As used herein, a "majority of isobutane" in the condensing agents shall refer to >50 mol %, for example, >60, >70, >75, >80, >85, >85, or >90 mol %, based upon the total moles of condensing agents.

For example, in some embodiments, the invention provides for a polymerization process, the process comprising contacting one or more monomers, at least one catalyst system, and at least two condensing agents comprising a majority of isobutane under polymerizable conditions to produce a polyolefin polymer.

In every embodiment, the process comprises contacting one or more monomers, at least one catalyst system, and at least two condensing agents under polymerizable conditions to produce a polyolefin polymer; wherein the vapor pressure of the condensing agents is ±4 bara of the optimum vapor pressure given by the formula: optimum vapor pressure=614−716*D+2.338*P+3.603*ln(MI), where the optimum vapor pressure has units (bara), D is the polyolefin polymer density (ASTM D1505) with units (g/cc), P is the polymerization condition pressure with units (barg), and MI is the polyolefin polymer melt index ($I_{2.16}$) (ASTM D1238) with units (g/10 min). As used herein, the "vapor pressure of the condensing agents" is calculated as described in "The Properties of Gases and Liquids," 5$^{th}$ Ed. by Reid, Prausnitz, and Sherwood according to the following equations:

$$\ln\left(\frac{P_i^{vap}}{P_i^c}\right) = \frac{A_i\tau_i + B_i\tau_i^{1.5} + C_i\tau_i^3 + D_i\tau_i^6}{1 - \tau_i}$$

$$P^{vap} = \sum_{i=1}^{n} P_i^{vap} x_i$$

where:

$$\tau_i = 1 - \frac{T}{T_i^c}$$

$P^{vap}$=vapor pressure of ICA mixture
$x_i$=mole fraction of component "i"
$P_i^{vap}$=vapor pressure of component "i"
$P_i^c$=critical pressure of component "i"
T reactor temperature
$T_i^c$=critical temperature of component "i"
$A_i$, $B_i$, $C_i$ and $D_i$=constant parameters for component "i" provided in the table below.

|  | Ai | Bi | Ci | Di | Critical Temp (K) | Critical Press (bar) |
|---|---|---|---|---|---|---|
| Isobutane | −6.95579 | 1.5009 | −2.52717 | −1.49776 | 408.2 | 36.5 |
| n-Butane | −9.487 | 0.3313 | −0.00011 | −2.822E−09 | 425.2 | 38 |
| 2,2-dimethyl-propane | −6.89153 | 1.25019 | −2.28233 | −4.74891 | 433.8 | 32 |
| Isopentane | −7.12727 | 1.38996 | −2.54302 | −2.45657 | 460.4 | 33.9 |
| n-Pentane | −7.28936 | 1.53679 | −3.08367 | −1.02456 | 469.7 | 33.7 |
| Propane | −4.224 | 0.3063 | −0.00016 | −3.215E−08 | 369.8 | 42.5 |
| 1-Hexene | −7.76467 | 2.29843 | −4.44302 | 0.89947 | 504.1 | 31.7 |
| n-Hexane | −7.46765 | 1.44211 | −3.28222 | −2.50941 | 507.5 | 30.1 |
| Isohexane | −7.31728 | 1.3394 | −3.06807 | −1.99255 | 497.5 | 30.1 |

In certain embodiments, the process comprises contacting one or more monomers, at least one catalyst system, and at least two condensing agents under polymerizable conditions to produce a polyolefin polymer; wherein the production rate of the polyolefin polymer is at least 20% greater than the same process polymerizing with a condensing agent consisting essentially of isopentane. As used herein, a "consisting essentially of isopentane" in the condensing agent shall refer to >90 mol %, for example, >92, >94, >95, >96, >98 mol %, based upon the total amount of condensing agent in the reactor. As used herein, "the same process" shall refer to any gas phase process producing similar polymer products using comparable equipment. However, it shall not exclude the presence of or omission of other variances, steps, elements, equipment, or materials, whether or not, specifically mentioned. As used herein, "production rate" shall refer to a mass of polymer produced per unit of time with units, for example, lb/hr, metric tons/hr (T/hr) or kg/hr.

In some embodiments, the production rate is at least 25, 30, 35, 40, 45, 50, 55, 60, 65, or 70% greater than the same process polymerizing with a condensing agent consisting essentially of isopentane.

When expressed on a per unit of reactor volume basis, the production rate is called the "space time yield". As used herein, "space time yield" refers to production rate expressed on a per unit of reactor volume basis with units, for example, lb/hr/ft$^3$ (equivalent to units lb/ft$^3$/hr) or kg/hr/m$^3$. Unless otherwise specified, the space time yield values herein are calculated based on a reactor with bed height of 13.56 meters and diameter 4.42 meters. In some embodiments, the space time yield is from 200 to 350 kg/h/m$^3$. For example, the space time yield is from 200 to 320, 210 to 310, or 250 to 350 kg/hr/m$^3$. In some embodiments the space time yield is >200 kg/h/m$^3$. For example, the space time yield is >230, >240, >250, >260, or >270 kg/hr/m$^3$.

In some embodiments, the polyolefin density (ASTM D1505) is ≤0.920 g/cc and the space time yield is >250 kg/hr/m$^3$. For example, the density is ≤0.920 g/cc and the space time yield is >260, >270, >280, >300, >320, or >330 kg/m$^3$/hr.

In some embodiments, the polyolefin density (ASTM D1505) is ≤0.912 g/cc and the space time yield is >200 kg/hr/m$^3$. For example, the density is ≤0.912 g/cc and the space time yield is >210, >220, >240, >260, >280, or >300 kg/m$^3$/hr.

Catalyst Components and Catalyst Systems

The following is a non-limiting discussion of the various polymerization catalysts useful in the process of the invention. All numbers and references to the Periodic Table of Elements are based on the new notation as set out in Chemical and Engineering News, 63(5), 27 (1985), unless otherwise specified.

In the description herein, the transition metal compound may be described as a catalyst precursor, a transition metal catalyst, a polymerization catalyst, or a catalyst compound, and these terms are used interchangeably. The term activator is used interchangeably with the term co-catalyst. As used herein, "at least one catalyst system" refers to a combination comprising a catalyst compound and an activator capable of polymerizing monomers.

Metallocene Catalysts

Polymerization catalysts useful in embodiments of the invention include one or more metallocene compounds (also referred to herein as metallocenes or metallocene catalysts). Metallocene catalysts are generally described as containing one or more ligand(s) and one or more leaving group(s) bonded to at least one metal atom, optionally with at least one bridging group. The ligands are generally represented by one or more open, acyclic, or fused ring(s) or ring system(s) or a combination thereof. These ligands, preferably the ring(s) or ring system(s) are typically composed of one or more atoms selected from Groups 13 to 16 atoms of the Periodic Table of Elements; preferably, the atoms are selected from the group consisting of carbon, nitrogen, oxygen, silicon, sulfur, phosphorous, germanium, boron and aluminum or a combination thereof. Most preferably, the ring(s) or ring system(s) are composed of carbon atoms such as, but not limited to, those cyclopentadienyl ligands or cyclopentadienyl-type ligand structures or other similar functioning ligand structures such as a pentadiene, a cyclooctatetraendiyl, or an imide ligand. The metal atom is preferably selected from Groups 3 through 15 and the lanthanide or actinide series of the Periodic Table of Elements. Preferably, the metal is a transition metal from Groups 4 through 12, more preferably Groups 4, 5 and 6, and most preferably the transition metal is from Group 4.

Exemplary metallocene catalysts and catalyst systems are described in for example, U.S. Pat. Nos. 4,530,914; 4,871,705; 4,937,299; 5,017,714; 5,055,438; 5,096,867; 5,120,867; 5,124,418; 5,198,401; 5,210,352; 5,229,478; 5,264,405; 5,278,264; 5,278,119; 5,304,614; 5,324,800; 5,347,025; 5,350,723; 5,384,299; 5,391,790; 5,391,789; 5,399,636; 5,408,017; 5,491,207; 5,455,366; 5,534,473; 5,539,124; 5,554,775; 5,621,126; 5,684,098; 5,693,730; 5,698,634; 5,710,297; 5,712,354; 5,714,427; 5,714,555; 5,728,641; 5,728,839; 5,753,577; 5,767,209; 5,770,753; 5,770,664; EP-A-0 591 756; EP-A-0 520-732; EP-A-0 420 436; EP-B1 0 485 822; EP-B1 0 485 823; EP-A2-0 743 324; EP-B1 0 518 092; WO 91/04257; WO 92/00333; WO 93/08221; WO 93/08199; WO 94/01471; WO 96/20233; WO 97/15582; WO 97/19959; WO 97/46567; WO 98/01455; WO 98/06759; and WO 98/011144.

Mixed Catalysts

In a class of embodiments of the invention, the at least one catalyst system may comprise a mixed catalyst, i.e., two or more of the same or different types of catalysts, such as the ones described above. For example, a metallocene catalyst may be combined with one or more of a conventional catalysts or advanced catalysts known in the art. An example of such catalyst is PRODIGY™ Bimodal Catalyst available from Univation Technologies, LLC, Houston, Tex. In every embodiment, the catalyst system comprises at least one metallocene catalyst.

Conventional Catalysts

The following is a discussion of conventional catalysts suitable for the mixed catalyst systems described above such as a metallocene catalyst combined with one or more conventional catalysts. Conventional catalysts generally known in the art refer to Ziegler Natta catalysts or Phillips-type chromium catalysts. Examples of conventional-type transition metal catalysts are discussed in U.S. Pat. Nos. 4,115,639; 4,077,904; 4,482,687; 4,564,605; 4,721,763; 4,879,359; and 4,960,741. The conventional catalyst compounds that may be used in the present invention include transition metal compounds from Groups 3 to 10, preferably 4 to 6 of the Periodic Table of Elements.

These conventional-type transition metal catalysts may be represented by the formula:

$$MR_x$$

where M is a metal from Groups 3 to 10, preferably Group 4, more preferably titanium; R is a halogen or a hydrocarbyloxy group; and x is the valence of the metal M, preferably x is 1, 2, 3 or 4, more preferably x is 4. Non-limiting examples of R include alkoxy, phenoxy, bromide, chloride and fluoride. Non-limiting examples of conventional-type transition metal catalysts where M is titanium include $TiCl_3$, $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_2H_5)_2Br_2$, $TiCl_3 \cdot 1/3AlCl_3$ and $Ti(OC_{12}H_{25})Cl_3$.

Conventional chrome catalysts, often referred to as Phillips-type catalysts, may include $CrO_3$, chromocene, silyl chromate, chromyl chloride ($CrO_2Cl_2$), chromium-2-ethylhexanoate, chromium acetylacetonate ($Cr(AcAc)_3$). Non-limiting examples are disclosed in U.S. Pat. Nos. 2,285,721; 3,242,099; and 3,231,550.

For optimization, many conventional catalysts require at least one cocatalyst. A detailed discussion of cocatalysts may be found in U.S. Pat. No. 7,858,719, col. 6, line 46, bridging col. 7, line 45.

Activator and Activation Methods

The above described polymerization catalysts, particularly, metallocene catalysts, are typically activated in various ways to yield polymerization catalysts having a vacant coordination site that will coordinate, insert, and polymerize olefin(s).

As used herein, the term "activator" refers to any compound that can activate any one of the polymerization catalyst compounds described herein by converting the neutral polymerization catalyst compound to a catalytically active catalyst cation compound. Non-limiting activators, for example, include alumoxanes, aluminum alkyls, ionizing activators, which may be neutral or ionic, and conventional-type cocatalysts. A detailed discussion of activators and activation methods may be found in U.S. Pat. No. 7,858,719, col. 14, line 21, bridging col. 17, line 30.

Method for Supporting

The above described catalysts and catalyst systems may be combined with one or more support materials or carriers using one of the support methods well known in the art. In several classes of embodiments of the invention, the at least one catalyst system is in a supported form.

As used herein, the terms "support" or "carrier" are used interchangeably and are any porous or non-porous support material, preferably, a porous support material, for example, talc, inorganic oxides and inorganic chlorides, for example silica or alumina. Other carriers include resinous support materials such as polystyrene, a functionalized or cross-linked organic supports, such as polystyrene divinyl benzene polyolefins or polymeric compounds, or any other organic or inorganic support material and the like, or mixtures thereof.

The preferred carriers are inorganic oxides that include those Group 2, 3, 4, 5, 13 or 14 metal oxides. The preferred supports include silica, alumina, silica-alumina, magnesium chloride, and mixtures thereof. Other useful supports include magnesia, titania, zirconia, montmorillonite and the like. Also, combinations of these support materials may be used, for example, silica-chromium and silica-titania.

Examples of supported metallocene catalyst systems are described in U.S. Pat. Nos. 4,701,432; 4,808,561; 4,912,075; 4,925,821; 4,937,217; 5,008,228; 5,238,892; 5,240,894; 5,332,706; 5,346,925; 5,422,325; 5,466,649; 5,466,766; 5,468,702; 5,529,965; 5,554,704; 5,629,253; 5,639,835; 5,625,015; 5,643,847; 5,648,310; 5,665,665; 5,698,487; 5,714,424; 5,723,400; 5,723,402; 5,731,261; 5,743,202; 5,759,940; 5,767,032; 5,688,880; 5,770,755; and 5,770,664; WO 95/32995; WO 95/14044; WO 96/06187; WO96/11960; and WO96/00243.

Examples of supported conventional catalyst systems are described in U.S. Pat. Nos. 4,894,424; 4,376,062; 4,395,359; 4,379,759; 4,405,495; 4,540,758; and 5,096,869.

Polymerization Process

Embodiments of the at least one catalyst system described above are suitable for use in any gas phase polymerization process, including fluidized bed or stirred bed processes. Particularly preferred is a gas phase polymerization process in which one or more condensable agents as described below is utilized.

Typically in a gas phase polymerization process, a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of at least one catalyst system under polymerizable conditions. As used herein, "polymerizable conditions" refers to any and all process conditions and any and all equipment necessary and suitable to polymerize olefins into polyolefins. In a preferred class of embodiments of the invention, a condensable agent as described below, is introduced to the process for purposes of increasing the cooling capacity of the recycle stream. The purposeful introduction of a condensable agent with the recycle stream temperature below the recycle stream dew point into a gas phase process is referred to as a "condensed mode process" discussed in greater detail below. The gaseous stream is withdrawn from the fluidized bed and recycled back into the reactor. Simultaneously, polymer product is withdrawn from the reactor and fresh reactants including monomers are added to the reactor. See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228, and also the Background section of this Application.

Condensed Mode Process

The condensing agent may be used in a gas phase polymerization process or simply a gas phase process. The gas phase process is operated in a condensed mode where a condensing agent as described above is introduced to the process at a temperature below the dew point of the gas to increase the cooling capacity of the recycle stream. The gas phase process is particularly well-suited for polymerizing one or more olefin(s), preferably at least one of which is ethylene or propylene, in a fluidized bed reactor, the process operating in a condensed mode in which a liquid and a gas are introduced to the fluidized bed reactor having a fluidizing medium or a stirred bed reactor having a medium, wherein the level of condensable fluid, is greater than 5 weight percent, preferably, greater than 10 weight percent, or greater than 15 weight percent or greater than 20 weight percent, more preferably greater than 25 weight percent, even more preferably greater than 30 weight percent, still even more preferably greater than 35 weight percent, and most preferably greater than 30 weight percent up to 60 weight percent, preferably 50 weight percent or alternatively, 55 weight percent, 60 weight percent, 65 weight percent, 70 weight percent, 75 weight percent, 80 weight percent, 85 weight percent, 90 weight percent, 91 weight percent, 92 weight percent, 95 weight percent, 96 weight percent, 97 weight percent, 98 weight percent, or 99 weight percent, based on the total weight of the liquid and gas entering the reactor. For further details of a condensed mode process see, for example, U.S. Pat. No. 5,436,304.

In one preferred embodiment of the invention, the invention is directed to a process, preferably a continuous process, for polymerizing monomer(s) in a reactor, said process comprising the steps of: (a) introducing a recycle stream into the reactor, the recycle stream comprising one or more monomer(s); (b) introducing a polymerization catalyst and a condensable fluid into the reactor; (c) withdrawing the recycle stream from the reactor; (d) cooling the recycle stream to form a gas phase and a liquid phase; (e) reintroducing the gas phase and the liquid phase into the reactor; (f) introducing into the reactor additional monomer(s) to replace the monomer(s) polymerized; and (g) withdrawing a polymer product from the reactor. In an embodiment, the condensable fluid is introduced in amounts greater than 10 weight percent or greater than 15 weight percent or greater than 20 weight percent, preferably greater than 25 weight percent, more preferably greater than 30 weight percent or greater than 35 weight percent, and most preferably greater than 40 weight percent based on the total weight of fluidizing medium being reintroduced into the reactor.

Reactor Conditions

The reactor pressure in any of the gas phase processes described in the above embodiments vary from about 100 psig (0.69 barg) to about 500 psig (34.5 barg), preferably, in the range of from about 290 psig (20 barg) to about 348 psig (24 barg).

The reactor temperature in any of the gas phase processes described in the above embodiments vary from about 30° C. to about 120° C., preferably from about 60° C. to about 115° C., more preferably in the range of from about 70° C. to 110° C., and most preferably in the range of from about 70° C. to about 100° C. In another embodiment, the polymerization temperature is above ambient temperature (23° C.), preferably above 30° C., preferably above 50° C., preferably above 70° C.

In several classes of embodiments of the invention, the process produces greater than 500 lbs of polymer per hour (227 kg/hr) to about 200,000 lbs/hr (90,900 kg/hr) or higher of polymer, preferably greater than 1000 lbs/hr (455 kg/hr), more preferably greater than 10,000 lbs/hr (4540 kg/hr), even more preferably greater than 25,000 lbs/hr (11,300 kg/hr), still more preferably greater than 35,000 lbs/hr (15,900 kg/hr), still even more preferably greater than 100,000 lbs/hr (45,500 kg/hr), and most preferably greater than 65,000 lbs/hr (29,000 kg/hr) to greater than 200,000 lbs/hr (90,700 kg/hr).

Monomers and Polymers

Polymers produced in accordance with invention are olefin polymers or "polyolefins". As used herein, "olefin polymers" or "polyolefin" refers to at least 75 mol % of the polymer is derived from hydrocarbon monomers, preferably at least 80 mol %, preferably at least 85 mol %, preferably at least 90 mol %, preferably at least 95 mol %, and preferably at least 99 mol %. Hydrocarbon monomers are monomers made up of only carbon and hydrogen. For example, the monomers to be polymerized are aliphatic or alicyclic hydrocarbons. (as defined under "Hydrocarbon" in Hawley's Condensed Chemical Dictionary, 13th edition, R. J. Lewis ed., John Wiley and Sons, New York, 1997). In another embodiment of the invention, the monomers to be polymerized are linear or branched alpha-olefins, preferably $C_2$ to $C_{40}$ linear or branched alpha-olefins, preferably $C_2$ to $C_{20}$ linear or branched alpha-olefins, e.g., ethylene, propylene, butene, pentene, hexene, heptene, octene, nonene, decene, undecene, dodecene, or mixtures thereof. Well-suited monomers include two or more olefin monomers of ethylene, propylene, butene-1, pentene-1,4-methyl-pentene-1, hexene-1, heptene-1, octene-1, decene-1, and mixtures thereof.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention include butadiene, norbornene, norbornadiene, isobutylene, vinylbenzocyclobutane, ethylidene norbornene, isoprene, dicyclopentadiene and cyclopentene.

In another embodiment of the invention, ethylene or propylene is polymerized with at least two different comonomers, optionally, one of which may be a diene, to form a terpolymer.

The polymers produced by the process of the invention are useful in making a wide variety of products and useful in many end-use applications. The polymers produced by the process of the invention include low density polyethylenes, linear low density polyethylenes, medium density polyethylene, and high density polyethylenes.

The polymers produced, typically polyethylene polymers, may have a density (ASTM D1505) in the range of from 0.860 g/cc to 0.970 g/cc, preferably in the range of from 0.880 g/cc to 0.965 g/cc, more preferably in the range of from 0.900 g/cc to 0.920 g/cc, even more preferably in the range of from 0.900 g/cc to 0.918 g/cc, yet even more preferably in the range from 0.910 g/cc to 0.915 g/cc, preferably greater than 0.900 g/cc, and most preferably greater than 0.905 g/cc.

In one embodiment, the polymers produced by the process of the invention typically have a molecular weight distribution, a weight average molecular weight to number average molecular weight (Mw/Mn) of about 1.5 to about 30, particularly about 2 to about 15, more preferably about 2 to about 10, even more preferably about 2.2 to less than about 8, and most preferably from about 2.5 to about 8. The ratio of Mw/Mn is measured by gel permeation chromatography techniques well known in the art.

In several classes of embodiments of the invention, the polyethylene polymers typically have a narrow or broad composition distribution as measured by Composition Distribution Breadth Index (CDBI). Further details of determining the CDBI of a copolymer are known to those skilled in the art. See, for example, WO 93/03093. CDBI's may be generally in the range of greater than 50% to 99%, preferably in the range of 55% to 85%, and more preferably 60% to 80%, even more preferably greater than 60%, still even more preferably greater than 65%. Alternatively, CDBI's may be generally less than 50%, more preferably less than 40%, and most preferably less than 30%.

Polyethylene polymers may have a melt index (MI) or ($I_2$) as measured by ASTM-D-1238-E in the range from 0.01 dg/min to 1000 dg/min, more preferably from about 0.01 dg/min to about 100 dg/min, even more preferably from about 0.1 dg/min to about 50 dg/min, and most preferably from about 0.1 dg/min to about 10 dg/min. The polyethylene polymers may have a melt index ratio ($I_{21.6}/I_{2.16}$ or for a shorthand "$I_{21}/I_2$") (measured by ASTM-D-1238-F) of from 10 to less than 25, more preferably from about 15 to less than 25. Further, in another embodiment, the polymers have a melt index ratio ($I_{21}/I_2$) of from preferably greater than 25, more preferably greater than 30, even more preferably greater than 40, still even more preferably greater than 50 and most preferably greater than 65. Alternatively, the polyethylene polymers may have a melt index ratio ($I_{21}/I_2$) in the range of from 15 to 40, preferably in the range of from about 20 to about 35, more preferably in the range of from about 22 to about 30, and most preferably in the range of from 24 to 27.

Polymers produced by the processes of the invention are useful in forming a variety of articles. Such articles include without limitation films, sheets, and fibers. The articles may be produced by extrusion and co-extrusion as well as blow molding, injection molding, and rotational molding. Films include blown or cast films formed by coextrusion or by lamination, shrink film, cling film, stretch film, sealing films, and oriented films. The films are useful in packaging, heavy duty bags, grocery sacks, food packaging, medical packaging, industrial liners, geo-membranes, etc. Fibers include melt spinning, solution spinning and melt blown fiber operations for use in woven or non-woven form to make filters, diaper fabrics, medical garments, geotextiles, etc. Extruded articles include medical tubing, wire and cable coatings, geomembranes, and pond liners. Molded articles include single and multi-layered constructions in the form of bottles, tanks, large hollow articles, rigid food containers, playground equipment, toys, etc.

Examples

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

Comparative Examples 1-8 (see Table 2) model reactor operation using condensing agent consisting essentially of isopentane. Examples 9-24 (see Table 3) use a variety of condensing agents. Modelling was done using methods shown in U.S. Pat. No. 7,683,140, column 62, row 48 bridging column 69, row 51. These examples use the same physical property sources as the aforementioned patent. These examples also employ the same exemplary calculation as used in U.S. Pat. No. 7,683,140 (see Table 3 in Column 69). Table 1 shows the full set of solubility parameters used in these examples.

TABLE 1

| Solubility Parameters (($cal/cm^3)^{1/2}$) | |
| --- | --- |
| Propane | 6.396 |
| n-Butane | 7.062 |
| Iso-Butane | 6.853 |
| n-Pentane | 7.055 |
| Iso-Pentane | 6.771 |
| 2,2-dimethylpropane | 6.382 |
| Iso-hexane (aka 2-methylpentane) | 7.044 |
| 1-Hexene | 7.352 |
| Polyethylene | 7.950 |

The maximum production rate for metallocene polyethylenes of various densities in a 14.5 ft (4.42 m) diameter gas phase reactor were calculated by optimizing the blend ratio of ICAs, within three constraints. First, the dew point of the total gas mixture at the inlet pressure was at least 10° C. lower than reactor temperature. Second, the total nitrogen content in the reactor was no less than 12 mol %. Third, the delta melt initiation temperature limit (ΔMIT) was calculated as described in U.S. Pat. No. 7,683,140. Calculations are based upon Soave-Redlich-Kwong thermodynamic properties. Once the maximum production rate was determined, the corresponding ICA vapor pressure was calculated as previously described. Results of these calculations are illustrated in Table 2 for Comparative Examples 1-8 using isopentane condensing agent and Tables 3(a) and 3(b) for examples 9-24 using condensing agent blends.

TABLE 2

| Comparative Examples | 1 | 2 | 3 | 4 | 5 | 6 | 7 | 8 |
|---|---|---|---|---|---|---|---|---|
| Reactor pressure (barg) | | | 20 | | | | 24 | |
| Reactor temperature (° C.) | 80.0 | 82.22 | 85.00 | 87.78 | 80.00 | 82.22 | 85.00 | 87.78 |
| Reactor pressure (barg) | 20 | 20 | 20 | 20 | 24 | 24 | 24 | 24 |
| MI (g/10 min) | 0.98 | 1.02 | 0.95 | 0.95 | 0.98 | 1.02 | 0.95 | 0.95 |
| Density (g/cm$^3$) | 0.910 | 0.915 | 0.918 | 0.922 | 0.910 | 0.915 | 0.918 | 0.922 |
| Reactor gas composition (fixed), mol % | | | | | | | | |
| Ethylene | 60.45 | 63.63 | 66.88 | 69.29 | 50.37 | 53.02 | 55.74 | 57.75 |
| Hydrogen | 0.02 | 0.02 | 0.02 | 0.02 | 0.02 | 0.02 | 0.02 | 0.01 |
| 1-Hexene | 1.53 | 1.48 | 1.42 | 1.19 | 1.27 | 1.23 | 1.18 | 0.99 |
| Nitrogen | 23.12 | 18.58 | 13.80 | 12.00 | 36.05 | 31.35 | 27.28 | 23.48 |
| Methane | 0.24 | 0.19 | 0.14 | 0.08 | 0.20 | 0.16 | 0.11 | 0.07 |
| Ethane | 1.16 | 1.31 | 1.29 | 1.45 | 0.97 | 1.09 | 1.08 | 1.21 |
| n-Hexane | 0.70 | 0.70 | 0.70 | 0.70 | 0.70 | 0.70 | 0.70 | 0.70 |
| Added ICAs (variable), mol % | | | | | | | | |
| Propane | | | | | | | | |
| n-Butane | | | | | | | | |
| Isobutane | | | | | | | | |
| n-Pentane | | | | | | | | |
| Isopentane | 12.79 | 14.09 | 15.75 | 15.27 | 10.42 | 12.43 | 13.90 | 15.80 |
| Neopentane | | | | | | | | |
| Isohexane | | | | | | | | |
| Vapor pressure of ICAs (includes Added ICAs and n-Hexane), bara | 4.39 | 4.65 | 4.99 | 5.32 | 4.36 | 4.63 | 4.97 | 5.32 |
| Production rate, metric tonnes/h | 44.7 | 48.6 | 53.7 | 53.0 | 44.0 | 50.5 | 55.6 | 61.8 |
| Space time yield, kg/h/m$^3$ | 215 | 234 | 258 | 255 | 212 | 243 | 267 | 297 |

TABLE 3a

| Optimum ICA blend cases | 9 | 10 | 11 | 12 | 13 | 14 | 15 | 16 |
|---|---|---|---|---|---|---|---|---|
| Reactor pressure (barg) | | | 20 | | | | 22 | |
| Reactor temperature (° C.) | 80.0 | 81.1 | 85.0 | 85.0 | 80.0 | 82.2 | 85.0 | 81.1 |
| Reactor pressure (barg) | 20 | 20 | 20 | 20 | 22 | 22 | 22 | 22 |
| MI (g/10 min) | 0.98 | 19.70 | 4.50 | 2.00 | 0.98 | 1.02 | 0.95 | 19.70 |
| Density (g/cm$^3$) | 0.910 | 0.918 | 0.917 | 0.918 | 0.910 | 0.915 | 0.918 | 0.918 |
| Reactor gas composition (fixed), mol % | | | | | | | | |
| Ethylene | 60.45 | 54.24 | 63.48 | 66.65 | 54.95 | 57.84 | 60.79 | 49.31 |
| Hydrogen | 0.02 | 0.06 | 0.03 | 0.03 | 0.02 | 0.02 | 0.02 | 0.06 |
| 1-Hexene | 1.53 | 1.23 | 1.54 | 1.52 | 1.39 | 1.34 | 1.29 | 1.12 |
| Nitrogen | 12.00 | 12.00 | 12.00 | 12.00 | 12.00 | 12.00 | 12.00 | 12.00 |
| Methane | 0.24 | 0.19 | 0.17 | 0.11 | 0.22 | 0.17 | 0.12 | 0.17 |
| Ethane | 1.16 | 1.42 | 1.53 | 1.22 | 1.06 | 1.19 | 1.17 | 1.29 |
| n-Hexane | 0.70 | 0.70 | 0.70 | 0.70 | 0.70 | 0.70 | 0.70 | 0.70 |
| Added ICAs (variable), mol % | | | | | | | | |
| Propane | | 2.08 | 2.79 | 0.58 | 4.00 | | | 10.99 |
| n-Butane | 8.90 | | 8.56 | 7.29 | | 9.40 | 15.00 | 24.27 |
| Isobutane | 1.18 | 25.91 | | | 15.52 | 12.87 | 1.78 | |
| n-Pentane | | | 9.20 | 9.90 | | | | |
| Isopentane | | | | | | 4.46 | 7.13 | |
| Neopentane | 13.83 | | | | 10.15 | | | |
| Isohexane | | 2.17 | | | | | | 0.10 |
| Vapor pressure of ICAs (includes Added ICAs and n-Hexane), bara | 6.83 | 13.98 | 9.36 | 6.04 | 13.88 | 9.42 | 6.60 | 14.72 |
| Predicted optimum vapor pressure of ICAs (includes Added ICAs and n-Hexane), bara | 8.82 | 14.21 | 9.46 | 6.11 | 13.50 | 10.69 | 8.09 | 18.89 |
| Production rate, metric tonnes/h | 54.2 | 54.7 | 55.2 | 54.0 | 59.4 | 59.8 | 61.7 | 61.4 |
| Space time yield, kg/h/m$^3$ | 260 | 263 | 265 | 260 | 285 | 287 | 296 | 295 |

TABLE 3b

| Optimum ICA blend cases | 17 | 18 | 19 | 20 | 21 | 22 | 23 | 24 |
|---|---|---|---|---|---|---|---|---|
| Reactor pressure (barg) | 22 | | | | 24 | | | |
| Reactor temperature (° C.) | 85.0 | 85.0 | 80.0 | 82.2 | 85.0 | 87.8 | 85 | 85 |
| Reactor pressure (barg) | 22 | 22 | 24 | 24 | 24 | 24 | 24 | 24 |
| MI (g/10 min) | 4.50 | 2.00 | 0.98 | 1.02 | 0.95 | 0.95 | 4.5 | 2.00 |
| Density (g/cm³) | 0.917 | 0.918 | 0.910 | 0.915 | 0.918 | 0.922 | 0.917 | 0.918 |
| Reactor gas composition (fixed), mol % | | | | | | | | |
| Ethylene | 57.71 | 60.59 | 50.37 | 53.02 | 55.72 | 57.75 | 52.90 | 55.54 |
| Hydrogen | 0.03 | 0.03 | 0.02 | 0.02 | 0.02 | 0.01 | 0.03 | 0.02 |
| 1-Hexene | 1.40 | 1.38 | 1.27 | 1.23 | 1.18 | 0.99 | 1.28 | 1.27 |
| Nitrogen | 12.00 | 12.00 | 12.00 | 12.00 | 12.00 | 12.00 | 12.00 | 12.00 |
| Methane | 0.15 | 0.10 | 0.20 | 0.16 | 0.11 | 0.07 | 0.14 | 0.09 |
| Ethane | 1.39 | 1.11 | 0.97 | 1.09 | 1.08 | 1.21 | 1.27 | 1.02 |
| n-Hexane | 0.70 | 0.70 | 0.70 | 0.70 | 0.70 | 0.70 | 0.70 | 0.70 |
| Added ICAs (variable), mol % | | | | | | | | |
| Propane | 13.10 | 6.95 | 10.40 | 2.92 | | | 13.10 | 11.67 |
| n-Butane | 14.07 | 9.45 | | | | 22.50 | 14.07 | 12.29 |
| Isobutane | | | 17.27 | 25.46 | 21.01 | | | |
| n-Pentane | 4.50 | 7.70 | | | | 4.58 | 4.50 | 5.40 |
| Isopentane | | | | 3.40 | 4.50 | | | |
| Neopentane | | | 6.80 | | 3.69 | 0.20 | | |
| Isohexane | | | | | | | | |
| Vapor pressure of ICAs (includes Added ICAs and n-Hexane), bara | 15.72 | 14.22 | 18.30 | 14.68 | 12.18 | 6.58 | 18.46 | 17.85 |
| Predicted optimum vapor pressure of ICAs (includes Added ICAs and n-Hexane), bara | 14.14 | 10.79 | 18.18 | 15.36 | 12.77 | 9.70 | 18.82 | 15.46 |
| Production rate, metric tonnes/h | 60.9 | 59.7 | 64.2 | 66.3 | 69.5 | 71.5 | 66.4 | 65.1 |
| Space time yield, kg/h/m³ | 293 | 287 | 308 | 319 | 334 | 344 | 319 | 313 |

Additionally, the optimum ICA vapor pressure was calculated according the inventive equation. Results are included in Table 3(a) and 3(b). FIG. 1 plots the optimum ICA vapor pressure calculation results for each ICA blend in Examples 9-24 against the ICA vapor pressure. The ICA vapor pressures fall within +/−4 bara of the optimum vapor pressure.

Figure 2:
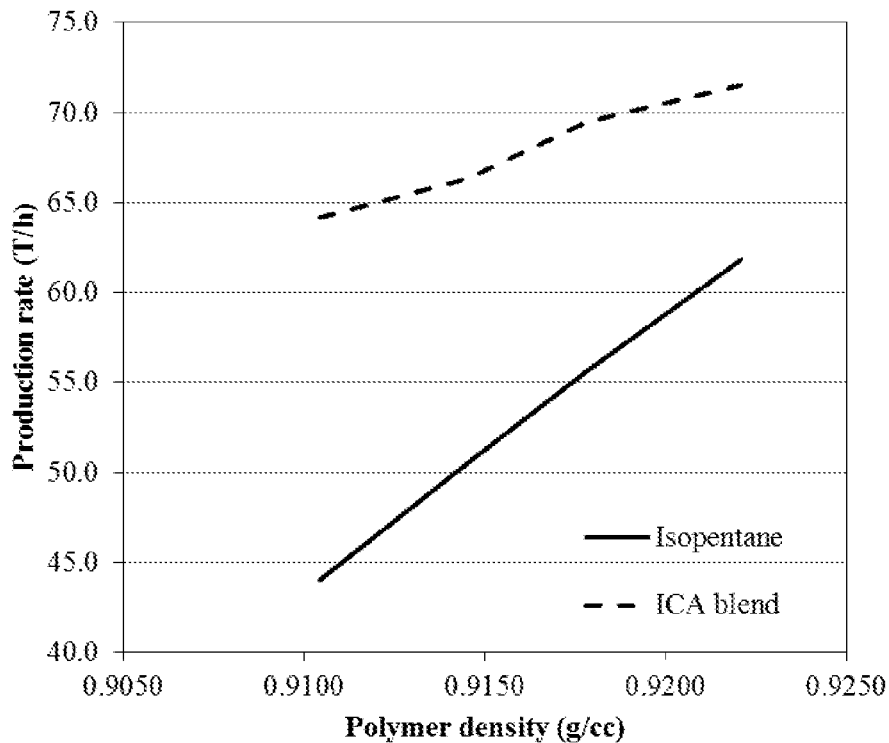
FIG. 2 indicates the increased production rate achievable using a condensing agent blend according to the invention vs the production rate achievable using a condensing agent consisting essentially of isopentane.

FIG. 2 indicates the increased production rate achievable using a condensing agent blend according to the invention vs the production rate achievable using a condensing agent consisting essentially of isopentane.

The phrases, unless otherwise specified, "consists essentially of" and "consisting essentially of" do not exclude the presence of other steps, elements, or materials, whether or not, specifically mentioned in this specification, so long as such steps, elements, or materials do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

We claim:

1. A polymerization process, the process comprising:
   selecting a polyolefin density and melt index as well as a polymerization condition pressure; and
   contacting one or more monomers, at least one catalyst system, and at least two condensing agents under polymerization conditions to produce a polyolefin polymer having polyolefin polymer density and melt index in accordance with the selected polyolefin density and selected melt index;
   wherein the process further comprises adjusting the vapor pressure of the condensing agents so that the vapor pressure of the condensing agents is ±4 bara of the optimum vapor pressure, wherein the optimum vapor pressure is given by the formula: optimum vapor pressure $=614-716*D+2.338*P+3.603*\ln(MI)$, where the optimum vapor pressure has units (bara), D is the polyolefin polymer density (ASTM D1505) with units (g/cc), P is the polymerization condition pressure with units (barg), and MI is the polyolefin polymer melt index ($I_{2.16}$) (ASTM D1238) with units (g/10 min).

2. A process for determining concentration of two or more condensing agents for polyolefin polymerization, the process comprising i) providing one or more monomers, at least one catalyst system, and at least two condensing agents, ii) selecting a polyolefin density and melt index as well as a polymerization condition pressure, and iii) adjusting the condensing agent composition so the vapor pressure of the condensing agents is within ±4 bara of the optimum vapor pressure given by the formula: optimum vapor pressure =614−716*D+2.338*P+3.603*ln(MI), where the optimum vapor pressure has units (bara), D is the polyolefin polymer density (ASTM D1505) with units (g/cc), P is the polymerization condition pressure with units (barg), and MI is the polyolefin polymer melt index ($I_{2.16}$) (ASTM D1238) with units (g/10 min).

3. The process of claim 1, where at least three condensing agents are used.

4. The process of claim 1, where the condensing agents comprise >20 mol% isobutane.

5. The process of claim 1, where the condensing agents comprise >20 mol% isobutane and the polyolefin polymer density (ASTM D1505) is <0.920 g/cc.

6. The process of claim 1, where the condensing agents comprise a majority of isobutane.

7. The process of claim 1, where the condensing agents comprise isobutane and 2,2-dimethylpropane.

8. The process of claim 1, where the condensing agents comprise isobutane and isopentane.

9. The process of claim 1, where the polyolefin polymer density is <0.920 g/cc and the space time yield is >250 kg/hr/m3.

10. The process of claim 1, wherein the polyolefin polymer is a copolymer of ethylene and $C_3$-C12 alpha-olefin.

11. The process of claim 1, wherein the polyolefin polymer is a copolymer of ethylene and $C_4$-$C_8$ alpha-olefin.

12. The process of claim 1, wherein the polyolefin polymer has a density (ASTM D1505) from 0.900 g/cm$^3$ to 0.920 g/cm$^3$.

13. The process of claim 1, wherein the polyolefin polymer has a density (ASTM D1505) from 0.900 g/cm$^3$ to 0.918 g/cm$^3$.

14. The process of claim 1, wherein the polyolefin polymer has a melt index ($I_{2.16}$) (ASTM D1238) from 15 g/10 min to 100 g/10 min.

15. The process of claim 1, wherein the at least one catalyst system comprises a metallocene catalyst or a mixture of at least one metallocene catalyst and one or more Ziegler-Natta, chromium, chromium oxide, $AlCl_3$, cobalt, iron, palladium, vanadium, or metallocene catalysts.

16. The process of claim 1, wherein the condensing agents comprise propane, n-butane, n-pentane, isopentane, 2,2-dimethylpropane, n- hexane, isohexane, n-heptane, n-octane, and/or mixtures thereof.

17. The process of claim 1, wherein the polymerization process is a gas phase polymerization process.

18. The process of claim 2, wherein the polymerization process is a gas phase polymerization process.

19. A polymerization process, the process comprising:
a) selecting polyolefin composition parameters comprising density ("D") and melt index ("MI");
b) selecting polyolefin polymerization process inputs comprising at least one catalyst system, one or more comonomers, and at least two condensing agents;
c) selecting polyolefin polymerization process conditions comprising a polymerization condition pressure ("P");
d) determining an optimum vapor pressure ("OVP") of the two or more condensing agents, wherein the optimum vapor pressure is:
614−716*D+2.338*P+3.603*ln(MI) and
D is expressed in g/cc,
P is express in barg,
MI is expressed in g/10 min., and
the optimum vapor pressure is expressed in bara;
e) contacting the at least one catalyst system, the one or more comonomers, and the at least two or more condensing agents under polymerization conditions comprising i) P and ii) OVP ±4 bara, such polymerization conditions sufficient to produce a polyolefin having density D and melt index MI.

20. The polymerization process of claim 19, wherein steps a)-e) are performed during a first time period, the process further comprising during a second time period: the process comprising:
a) selecting a new D, a new MI, or a combination thereof;
b) determining new OVP based on the new D, the new MI, or the combination thereof; and
c) contacting the at least one catalyst system, the one or more comonomers, and the at least two or more condensing agents under polymerization conditions comprising i) P and ii) new OVP ±4 bara, such polymerization conditions sufficient to produce a new polyolefin having the new D, the new MI, or the combination thereof.

* * * * *